(12) United States Patent
Papaioannou et al.

(10) Patent No.: US 6,705,255 B2
(45) Date of Patent: Mar. 16, 2004

(54) CRANKSHAFT FOR USE WITH A VARIABLE COMPRESSION RATIO SYSTEM

(75) Inventors: George Aristidis Papaioannou, Livonia, MI (US); Jeffrey Eliot Chottiner, Farmington Hills, MI (US); Joshua Putnam Styron, Canton, MI (US); Pravin Sashidharan, Inkster, MI (US); V. Durga Nageswar Rao, Bloomfield Hills, MI (US); Yash Andrew Imai, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,250

(22) Filed: Jun. 25, 2002

(65) Prior Publication Data

US 2003/0233989 A1 Dec. 25, 2003

(51) Int. Cl.⁷ ............................................... F02D 15/00
(52) U.S. Cl. ..................................................... 123/48 R
(58) Field of Search ................... 123/78 F, 78 E, 123/48 B, 196 R, 196 CP, 196 S, 197.4, 197.3; 184/6.5; 29/888.08

(56) References Cited

U.S. PATENT DOCUMENTS

| | | |
|---|---|---|
| 4,246,873 A | 1/1981 | Lih-Liaw |
| 4,286,552 A | 9/1981 | Tsutsumi |
| 4,370,901 A | 2/1983 | Bolen |
| 4,469,055 A | 9/1984 | Caswell |
| 4,493,226 A * | 1/1985 | Andrione et al. ............. 74/598 |
| 4,934,347 A | 6/1990 | Suga et al. |
| 4,979,427 A | 12/1990 | Pfeffer et al. |
| 5,146,879 A | 9/1992 | Kume et al. |
| 5,331,928 A | 7/1994 | Wood |
| 5,417,185 A | 5/1995 | Beattie |
| 5,562,068 A | 10/1996 | Sugimoto et al. |
| 5,724,863 A | 3/1998 | Kramer et al. |
| 5,865,092 A | 2/1999 | Woudwyk |
| 5,960,750 A | 10/1999 | Kreuter |
| 6,068,406 A * | 5/2000 | Yoshida et al. ............. 384/470 |
| 6,223,703 B1 | 5/2001 | Galvin |
| 6,499,446 B1 * | 12/2002 | Rao et al. .................. 123/48 B |

FOREIGN PATENT DOCUMENTS

| | | |
|---|---|---|
| JP | 3-092552 | 4/1991 |
| JP | 6-241058 | 8/1994 |

OTHER PUBLICATIONS

U.S. Pat. application Ser. No. 09/691,666, Filed Oct. 18, 2000, "Apparatus for Varying the Compression Ratio of an Internal Combustion Engine", V. Durga N. Rao et al.
U.S. Pat. application Ser. No. 09/682,263, Filed Aug. 10, 2001, "Connecting Rod for a Variable Compression Engine", V. Durga N. Rao et al.
"Variable Comression Ratio (VCR) Crank Mechanism", Victor Gheorghiu, University of Applied Sciences, Hamburg, Germany, 1 pp.
"New Saab and Citroen technology at Geneva", Automotive Engineering International, May 2000, pp. 96, 97.

\* cited by examiner

Primary Examiner—Tony M. Argenbright
Assistant Examiner—Hyder Ali
(74) Attorney, Agent, or Firm—John Buckert

(57) ABSTRACT

A crankshaft, for use with a variable compression ratio engine having a connecting rod and a rod bearing, includes a crankpin adapted to be coupled to the connecting rod with the rod bearing disposed between the crankpin and the connecting rod. The crankpin includes a circumferential surface having first and second side surface portions and a main surface portion disposed between the side surface portions. The main surface portion is configured to receive the rod bearing. The first side surface portion has a first aperture disposed at least partially outwardly of the rod bearing when the rod bearing is received on the main surface portion of the crankpin and the crankpin is coupled to the connecting rod. The crankpin further defines, at least partially, a first fluid passage for supplying pressurized fluid to the first aperture, such that the fluid is useable to vary compression ratio of the engine.

27 Claims, 9 Drawing Sheets

CRANKSHAFT FOR USE WITH A VARIABLE COMPRESSION RATIO SYSTEM

BACKGROUND OF INVENTION

1. Field of the Invention

The invention relates to a crankshaft for use with a variable compression engine.

2. Background Art

A "compression ratio" of an internal combustion engine is defined as the ratio of the volume in a cylinder above a piston when the piston is at bottom-dead-center (BDC) to the volume in the cylinder above the piston when the piston is at top-dead-center (TDC). In general, the higher the compression ratio (hence, the expansion ratio), the higher the thermal efficiency of the engine. This in turn results in improved fuel economy and a higher ratio of output energy versus input energy of the engine.

In conventional internal combustion engines, however, the compression ratio is fixed and cannot be changed to yield optimal performance. Accordingly, variable compression ratio (VCR) internal combustion engines have been developed to vary the clearance volume of a cylinder in order to achieve improved fuel economy and increased engine power performance. Such VCR engines may be designed to have a higher compression ratio during low load conditions, and a lower compression ratio during high load conditions.

One known apparatus is disclosed in U.S. Pat. No. 5,146,879. This apparatus includes an eccentric sleeve that is used to vary the effective length of a connecting rod coupled to a crankshaft. The apparatus also includes a lock device capable of fixing rotation of the eccentric sleeve in a desired position, and a fluid pressure drive system for controlling operation of the lock device. Fluid from the drive system is supplied through the crankshaft, then through apertures in a bearing disposed about the crankshaft, and into the lock device. The apertures in the bearing, however, reduce effective bearing surface for lubrication.

SUMMARY OF INVENTION

The present invention addresses the shortcomings of the prior art by providing a crankshaft that is configured to supply pressurized fluid to an engine so as to effect a change in compression ratio of the engine, without requiring apertures to be formed in an associated rod bearing for fluid transmission.

Under the invention, a crankshaft is provided for use with a variable compression ratio engine having a connecting rod and a rod bearing associated with the connecting rod. The crankshaft includes a crankpin adapted to be coupled to the connecting rod with the rod bearing disposed between the crankpin and the connecting rod. The crankpin includes a circumferential surface having first and second side surface portions and a main surface portion disposed between the side surface portions. The main surface portion is configured to receive the rod bearing. The first side surface portion has a first aperture that is disposed at least partially outwardly of the rod bearing when the rod bearing is received on the main surface portion of the crankpin and the crankpin is coupled to the connecting rod. The crankpin further defines, at least partially, a first fluid passage in fluid communication with the first aperture for supplying pressurized fluid to the first aperture, such that the fluid is useable to vary compression ratio of the engine.

DETAILED DESCRIPTION

Figure 1:
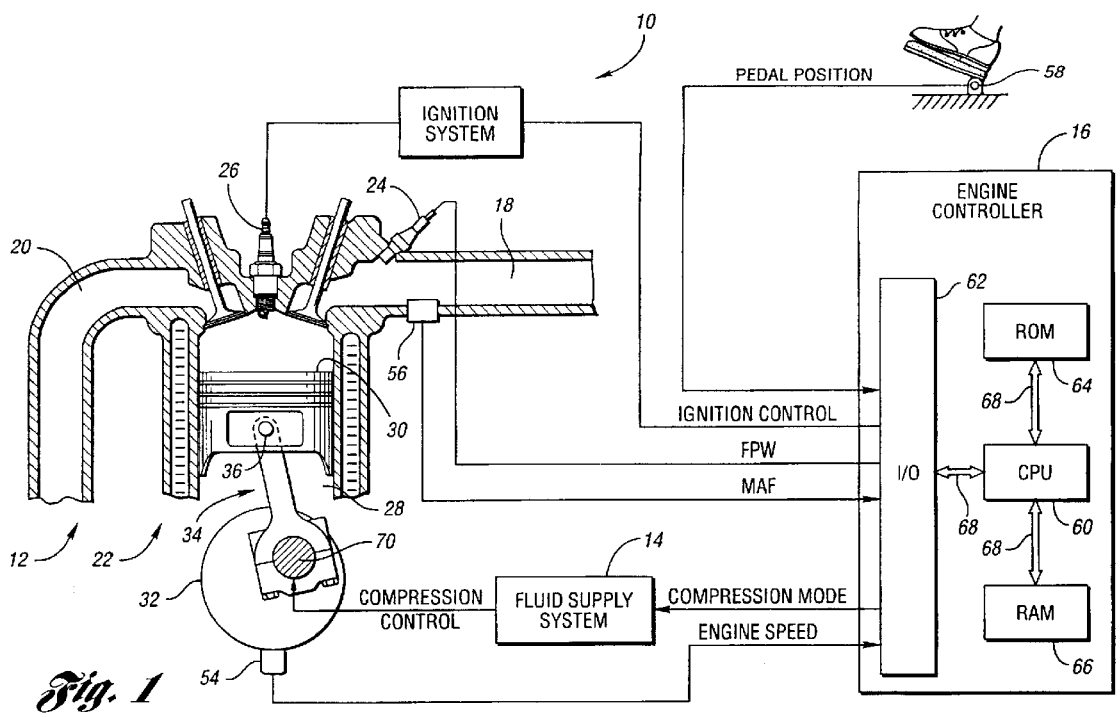
FIG. 1 is a diagram of a variable compression ratio system according to the invention including a variable compression ratio internal combustion engine, a fluid supply system and an engine controller in communication with the engine and the fluid supply system.
Figure 2:
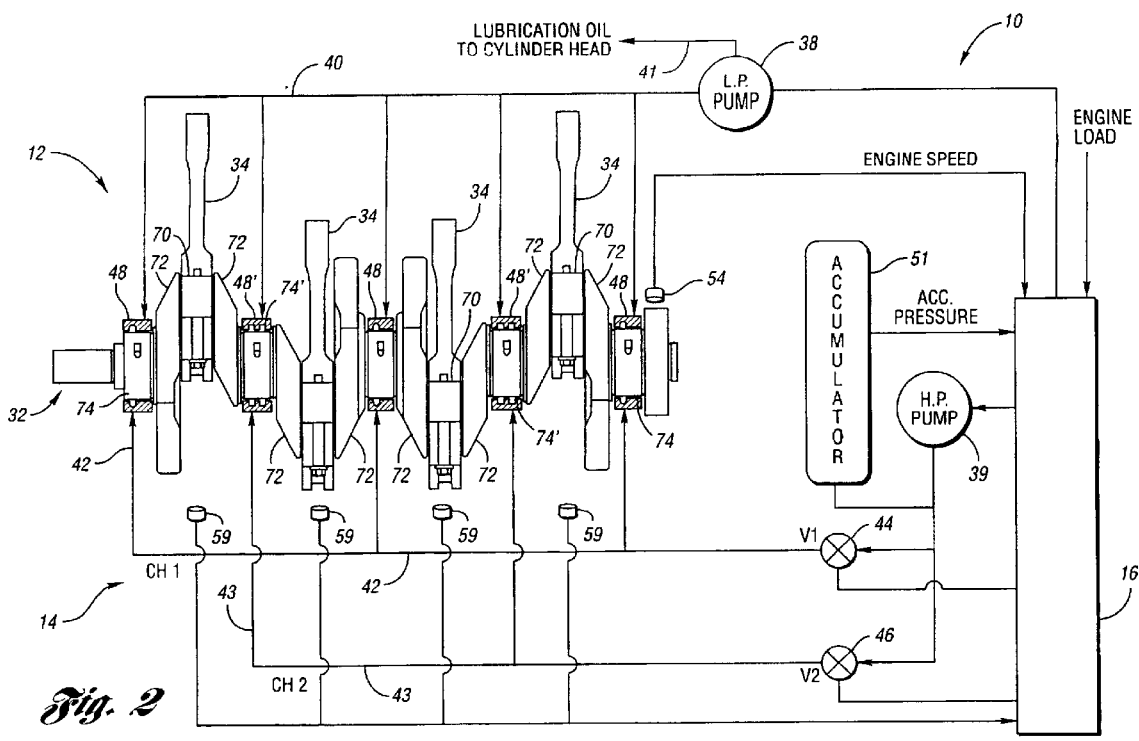
FIG. 2 is a diagram of the system of FIG. 1 showing multiple connecting rod assemblies of the engine mounted on a first embodiment of a crankshaft, according to the invention, wherein the connecting rod assemblies and the crankshaft are in fluid communication with the fluid supply system.

FIGS. 1 and 2 show diagrams of a variable compression ratio system 10 according to the invention for use with a vehicle (not shown). The system 10 includes a variable compression ratio internal combustion engine 12, a fluid supply system 14 and an engine controller 16 in electrical communication with the engine 12 and fluid supply system 14. While the engine 12, fluid supply system 14 and engine controller 16 are shown as separate components, the fluid supply system 14 and engine controller 16 may each be considered part of the engine 12.

The engine 12 shown in FIG. 1, by way of example and not limitation, is a gasoline, four-stroke, port fuel injection, internal combustion engine. Alternatively, the engine 12 may be any internal combustion engine, such as a direct fuel injection engine or a diesel engine. The engine 12 includes an air intake manifold 18, an exhaust manifold 20 and a plurality of cylinders 22 (only one shown) connected to the manifolds 18 and 20. Each of the cylinders 22 is fed fuel by one or more fuel injectors 24 and is supplied with an ignition spark by a spark plug 26. Furthermore, each cylinder 22 has a combustion chamber 28 for receiving a reciprocating piston 30. Each piston 30 is connected to a crankshaft 32 with a connecting rod, such as connecting rod assembly 34. More specifically, each piston 30 is coupled to a connecting rod assembly 34 with a wrist pin 36, and each connecting rod assembly 34 is coupled to crankshaft 32.

The crankshaft 32 and connecting rod assemblies 34 are in fluid communication with the fluid supply system 14, and each connecting rod assembly 34 is operative to vary the compression ratio of the engine 12 as explained below in greater detail. "Compression ratio" for a particular cylinder 22 is defined as the ratio of the volume in combustion chamber 28 above the piston 30 when the piston 30 is at bottom-dead-center (BDC) to the volume in the combustion chamber 28 above the piston 30 when the piston 30 is at top-dead-center (TDC). Although each connecting rod assembly 34 is described below as providing first and second or high and low compression ratios, each connecting rod assembly 34 may be configured to provide one or more intermediate compression ratios for the engine 12.

Alternatively, the engine 12 may include any suitable compression ratio varying mechanism that is in fluid communication with the fluid supply system 14 and crankshaft 32, and that is operative to vary compression ratio of the engine 12. For example, the engine 12 may include one or more variable height pistons.

Referring to FIG. 2, the fluid supply system 14 includes first and second fluid supply devices, such as low and high pressure pumps 38 and 39, respectively, that supply pressurized fluid, such as oil, to the engine 12. Each pump 38 and 39 may draw oil from a reservoir (not shown), which collects oil that drains from the engine 12. Furthermore, the low pressure pump 38 is in fluid communication with first and second low pressure passage arrangements 40 and 41, respectively, and the high pressure pump 39 is in fluid communication with first and second high pressure passage arrangements 42 and 43, respectively. The first high pressure passage arrangement 42 includes a first valve 44, and the second high pressure passage arrangement 43 includes a second valve 46.

When both valves 44 and 46 are closed, the low pressure pump 38 may operate to provide oil at a first pressure to the engine 12 for lubrication purposes. Such oil may be provided, for example, through first low pressure passage arrangement 40 to main bearings 48 and/or 48', and/or through second low pressure passage arrangement 41 to the cylinder head (not shown) of the engine 12. The main bearings 48 and 48' support the crankshaft 32 and include suitable passages for allowing oil to pass to the crankshaft 32.

When one of the valves 44 or 46 is open, the high pressure pump 39 and/or an accumulator 51, which stores high pressure oil, may provide oil at a second pressure greater than the first pressure to one of the high pressure passage arrangements 42 or 43. This oil is then provided through the main bearings 48 or 48' and crankshaft 32, and to the connecting rod assemblies 34 so as to vary the compression ratio of the engine 12. For example, the oil may be used to change the effective length of the connecting rod assemblies 34, as explained below in greater detail.

The fluid supply system 14 and connecting rod assemblies 34, or other compression ratio varying mechanisms, may be operated to effect a change in the compression ratio of the engine 12 in accordance with one or more operating parameters, such as engine load and speed. Referring to FIG. 1, such parameters may be measured by appropriate sensors, such as crankshaft speed sensor 54, mass air flow (MAF) sensor 56 and pedal position sensor 58, which are electronically coupled to the engine controller 16. Referring to FIG. 2, the engine 12 may also include one or more position sensors 59 for sensing position of the connecting rod assemblies 34.

Returning to FIG. 1, the engine controller 16 includes a central processing unit (CPU) 60, input/output ports 62, read-only memory (ROM) 64 or any suitable electronic storage medium containing processor-executable instructions and calibration values, random-access memory (RAM) 66, and a data bus 68 of any suitable configuration. The engine controller 16 receives signals from a variety of sensors, such as sensors 54, 56, 58 and 59, and controls operation of the fluid supply system 14, the fuel injectors 24 and the spark plugs 26.

Figure 3:
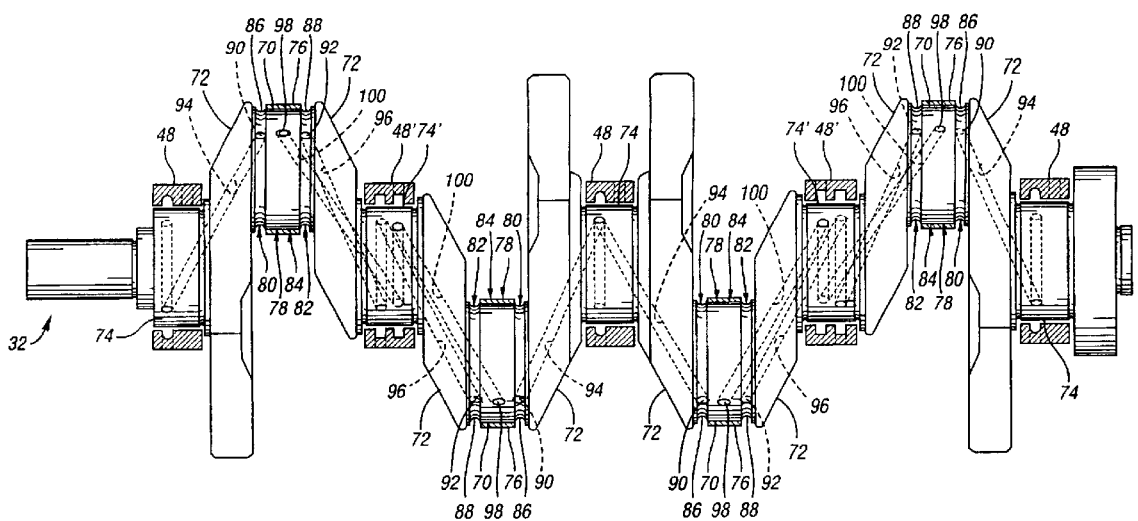
FIG. 3 is an enlarged view of the crankshaft showing multiple fluid passages.
Figure 4:
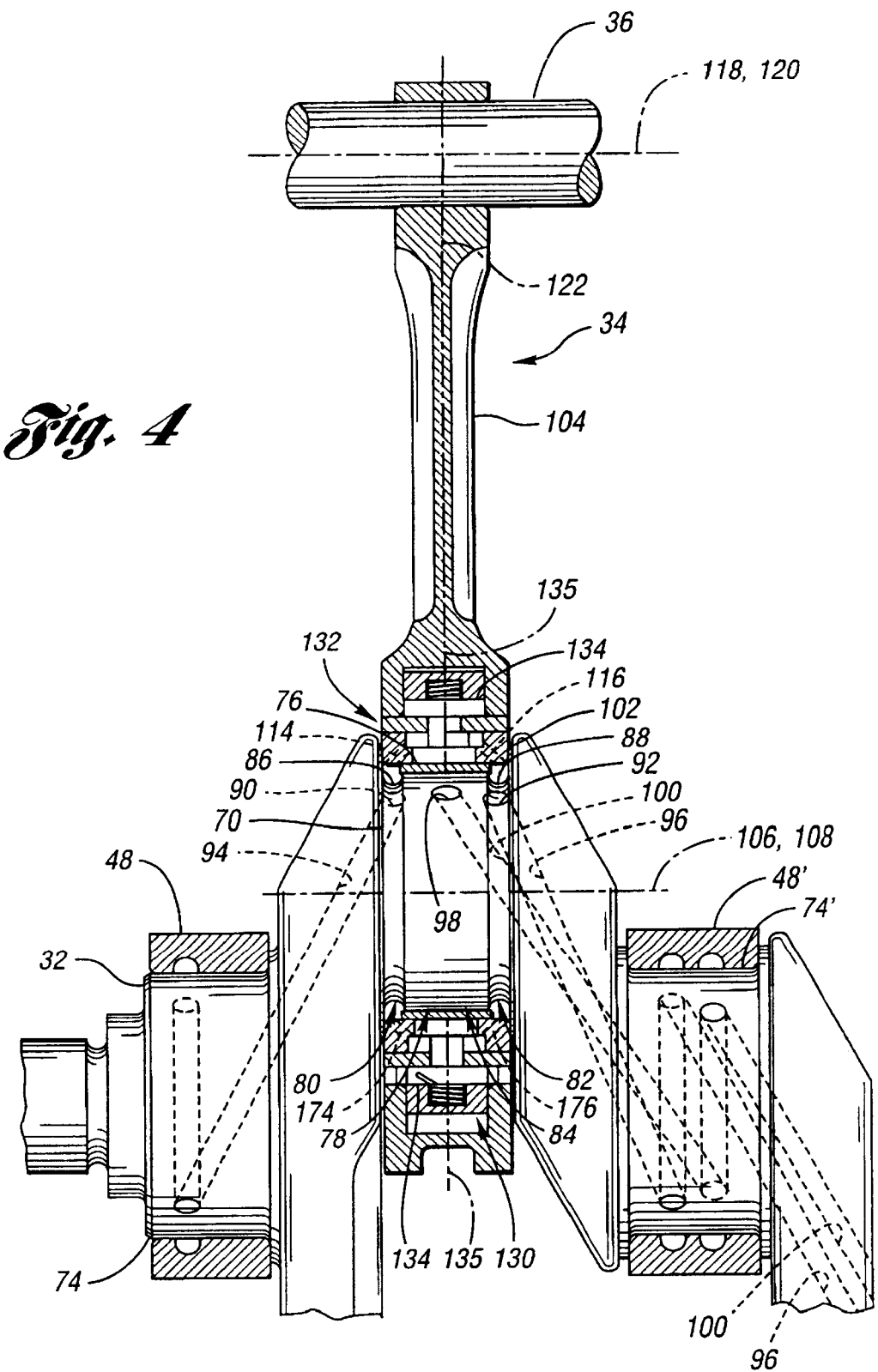
FIG. 4 is a cross-sectional view of one connecting rod assembly mounted on the crankshaft and shown in an unextended position.

Referring to FIGS. 2 through 4, the crankshaft 32 includes a plurality of crankpins 70 that each extend between two flange portions or crank cheeks 72, and a plurality of shaft portions, such as main journal portions 74 and 74', connected to the crank cheeks 72. Each crankpin 70 is coupled to a connecting rod assembly 34 with a rod bearing 76 disposed between the crankpin 70 and the connecting rod assembly 34. Referring to FIG. 3, each crankpin 70 includes a circumferential surface 78 that extends between adjacent crank cheeks 72. Each circumferential surface 78 includes first and second side surface portions 80 and 82, respectively, and a main surface portion 84 disposed between the side surface portions 80 and 82 and configured to mate with or otherwise receive a respective rod bearing 76.

In the embodiment shown in FIG. 3, the first and second side surface portions 80 and 82, respectively, of each crankpin 70 are undercut with respect to the main surface portion 84, and define first and second circumferential grooves 86 and 88, respectively. In another embodiment of the invention, the first and second side surface portions 80 and 82, respectively, of each crankpin 70 may each define a groove that does not extend entirely around the crankpin 70. For example, each side surface portion 80 and 82 may define a groove that extends 75% to 95% around a respective crankpin 70. Furthermore, for each crankpin 70, the first and second side surface portions 80 and 82, respectively, have first and second apertures 90 and 92, respectively, that are disposed at least partially axially outwardly of an associated rod bearing 76. In the embodiment shown in FIG. 3, a majority of each aperture 90 and 92 is disposed axially outwardly of the associated rod bearing 76. In another embodiment of the invention, the apertures 90 and 92 may be disposed entirely outwardly of the rod bearing 76. Furthermore, the apertures 90 and 92 may also be partially defined by a respective main surface portion 84.

The crankshaft 32 further includes multiple first and second fluid passages 94 and 96, respectively, that extend between the main journal portions 74, 74' and the crankpins 70. Each fluid passage 94 and 96 may be defined at least partially by a respective crankpin 70, a respective crank cheek 72, and a respective main journal portion 74, 74'. Furthermore, each first fluid passage 94 is in fluid communication with a respective first aperture 90, and each second fluid passage 96 is in fluid communication with a respective second aperture 92. The fluid passages 94 and 96 receive pressurized oil from the fluid supply system 14, and route the oil to the apertures 90 and 92 so that the oil is useable to vary the effective length of the connecting rod assemblies 34, as explained below in detail. Alternatively, the crankshaft 32 may supply pressurized oil, or other suitable fluid, to any suitable compression ratio varying mechanism or mechanisms.

Each main surface portion 84 of each crankpin 70 may also be provided with a main surface aperture or third aperture 98 for facilitating lubrication of the associated rod bearing 76. The crankshaft 32 may also include multiple third fluid passages 100 that extend between the main journal portions 74' and the crankpins 70. In one embodiment of the invention, each third fluid passage 100 is defined at least partially by a respective crankpin 70, a respective crank cheek 72, and a respective main journal portion 74'. Furthermore, each third fluid passage 100 may be in fluid communication with a respective third aperture 98 for supplying oil to a respective main surface portion 84.

FIGS. 4 through 7 show one connecting rod assembly 34 that may be used with the crankshaft 32. The connecting rod assembly 34 includes a first portion, such as bearing retainer 102, that is adapted to be rotatably coupled to a crankpin 70, and a second portion, such as body portion 104, that is adapted to be rotatably coupled to wrist pin 36. The bearing retainer 102 includes a bearing retainer axis 106 that is coincident with crankpin axis 108, and is configured to retain rod bearing 76 between the bearing retainer 102 and crankpin 70. For example, the bearing retainer 102 may include one or more projections (not shown) that extend through one or more recesses (not shown) in the rod bearing 76 so as to retain the rod bearing 76. As another example, the bearing retainer 102 may include protrusions that retain the rod bearing 76 therebetween. Such protrusions may extend along only a portion of the rod bearing 76, or the protrusions may form circumferential flanges.

The bearing retainer 102 may further include first and second sections 110 and 112, respectively, that are joined together in any suitable manner, such as with bolts, screws or other suitable fasteners (not shown). In addition, the bearing retainer 102 includes first and second bearing retainer passages 114 and 116, respectively, that are in fluid communication with the first and second grooves 86 and 88, respectively, so as to receive fluid from fluid supply system 14. Each bearing retainer passage 114 and 116 extends at least partially axially outwardly of the rod bearing 76 at an inner circumferential surface of the bearing retainer 102. In the embodiment shown in FIGS. 4 and 5, each bearing retainer passage 114 and 116 is disposed entirely axially outwardly of the rod bearing 76 at the inner circumferential surface of the bearing retainer 102.

The body portion 104 has a lateral axis 18 that is coincident with wrist pin axis 120. The body portion 104 also has a longitudinally extending body portion axis 122 and a body portion plane 124 that extends through the body portion axis 122 and bisects the body portion 104. In addition, the body portion 104 includes first and second sections 126 and 128, respectively, and each section 126 and 128 defines a generally semicircular aperture for receiving the bearing retainer 102. The sections 126 and 128 may be joined together in any suitable manner, such as with fasteners 129, so as to retain the bearing retainer 102 therebetween.

Figure 5:
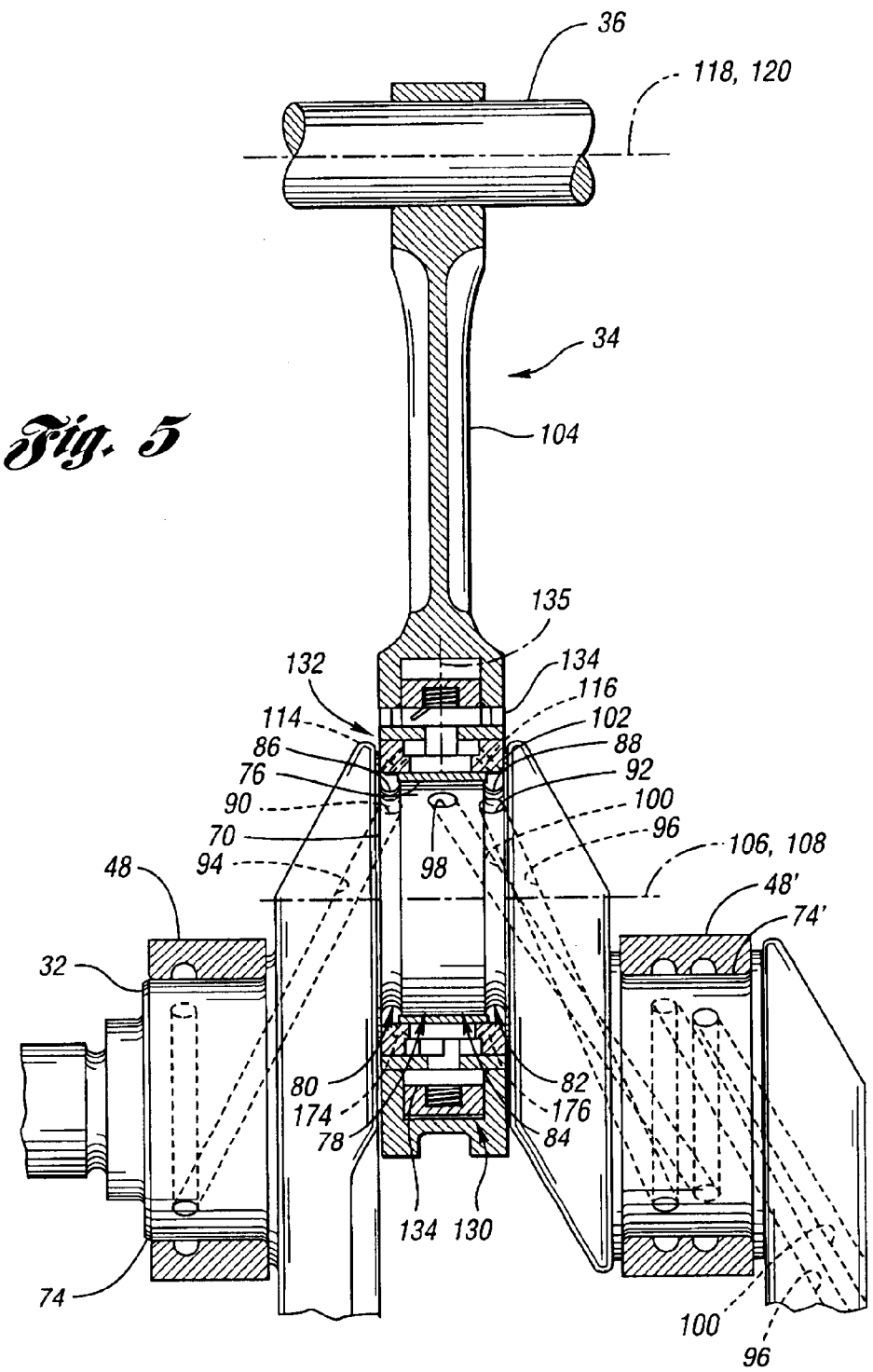
FIG. 5 is a cross-sectional view of the connecting rod assembly shown in an extended position.
Figure 6:
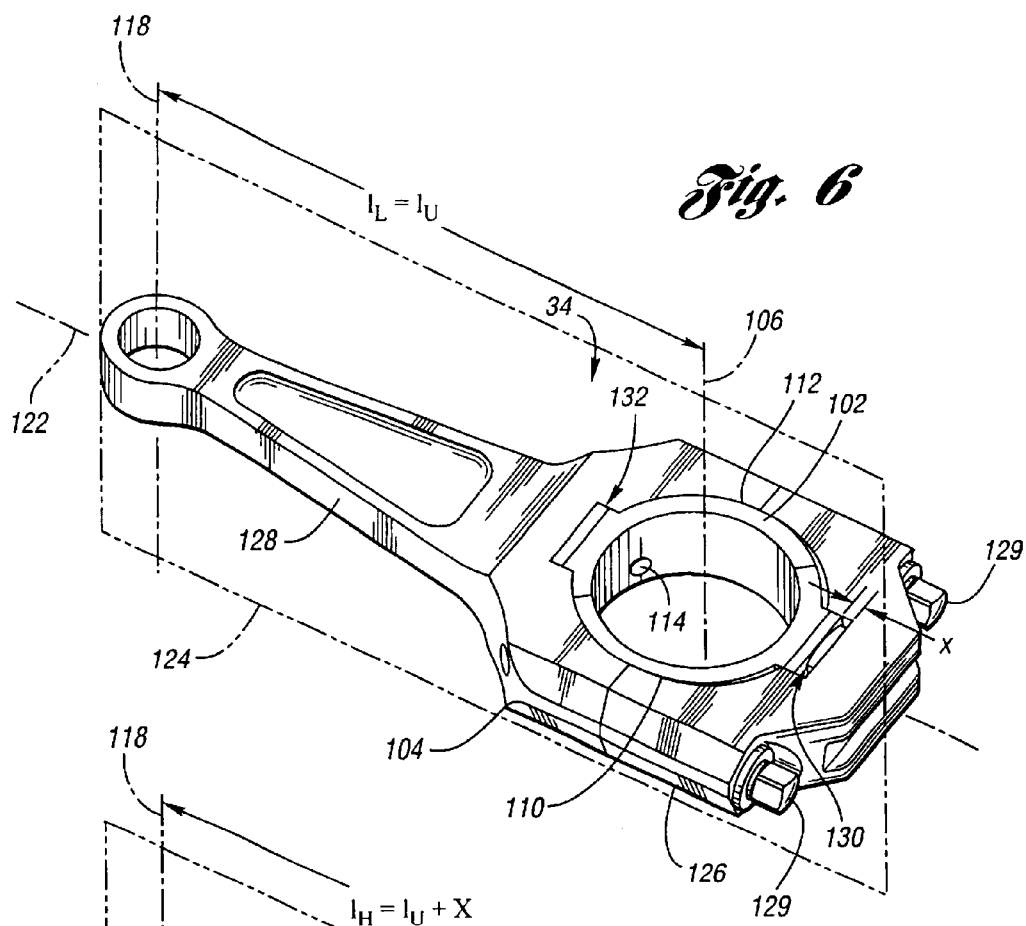
FIG. 6 is a perspective view of the connecting rod assembly in the unextended position and including first and second locking mechanisms.
Figure 7:
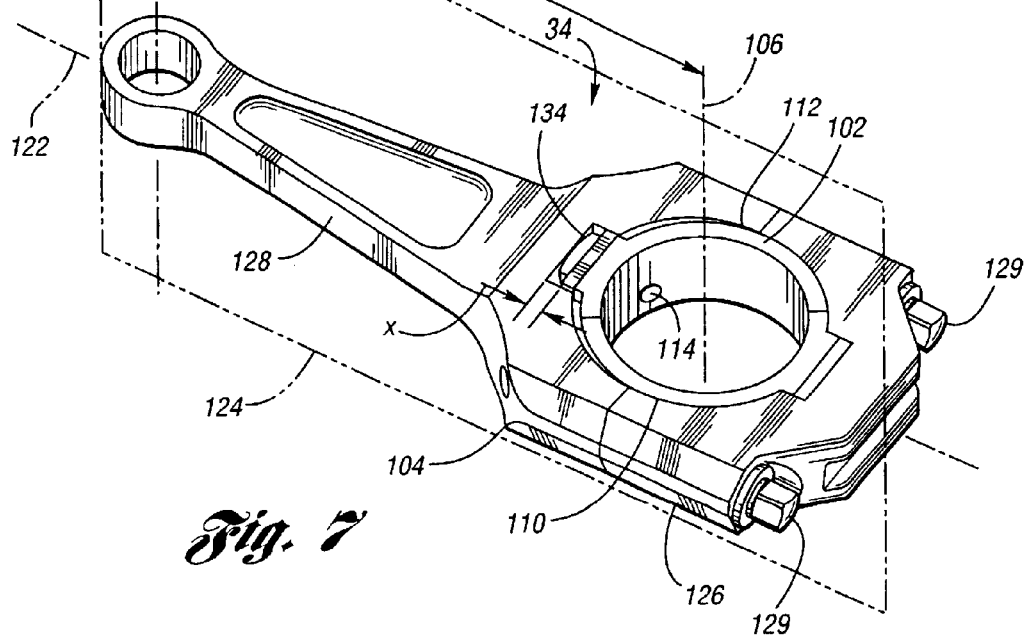
FIG. 7 is a perspective view of the connecting rod assembly in the extended position.

Furthermore, the body portion 104 is axially movable with respect to the bearing retainer 102 between a first position, or unextended position shown in FIGS. 4 and 6, and a second position, or extended position shown in FIGS. 5 and 7. In the embodiment shown in FIGS. 4 through 7, for example, the body portion 104 is displaceable by a distance x. When the body portion 104 is in the unextended position, which corresponds to a first or low compression ratio mode of the engine 12, the effective length $I_L$ of the body portion 104 is equal to the unextended length $I_U$. When the body portion 104 is in the extended position, which corresponds to a second or high compression ratio mode of the engine 12, the effective length $I_H$ of the body portion 104 is equal to the extended length $I_U+x$. Thus, the body portion 104 is selectively displaceable with respect to the bearing retainer 102 so as to cause a change in the effective length of the connecting rod assembly 34 and the compression ratio of the engine 12.

The connecting rod assembly 34 also includes first and second locking mechanisms 130 and 132, respectively, for locking the body portion 104 at the unextended and extended positions. While the locking mechanisms 130 and 132 may have any suitable configuration, in the embodiment shown in FIGS. 4 and 5, each locking mechanism 130 and 132 includes a locking member or element 134 having a locking element axis 135 about which the locking element 134 may rotate. Preferably, but not necessarily, each locking element axis 135 is coincident with or otherwise aligned with the body portion axis 122. Each locking element 134 is rotatable between an unlocked position and a locked position in which the locking element 134 extends into a gap formed between the bearing retainer 102 and the body portion 104. More specifically, when a particular locking element 134 is in the locked position, the locking element 134 overlaps and is engaged with the bearing retainer 102 and the body portion 104 (the locking element 134 of the first locking mechanism 130 is shown in the locked position in FIG. 4 and the unlocked position in FIG. 5, and the locking element 134 of the second locking mechanism 132 is shown in the unlocked position in FIG. 4 and the locked position in FIG. 5).

Furthermore, when a particular locking element 134 is in the locked position, the locking element 134 preferably, but not necessarily, intersects the body portion plane 124 shown in FIG. 6. With such a configuration, the locking elements 134 inhibit rotational movement or twisting of the body portion 104 relative to the bearing retainer 102 when the locking elements 134 are compressively loaded.

Figure 8:
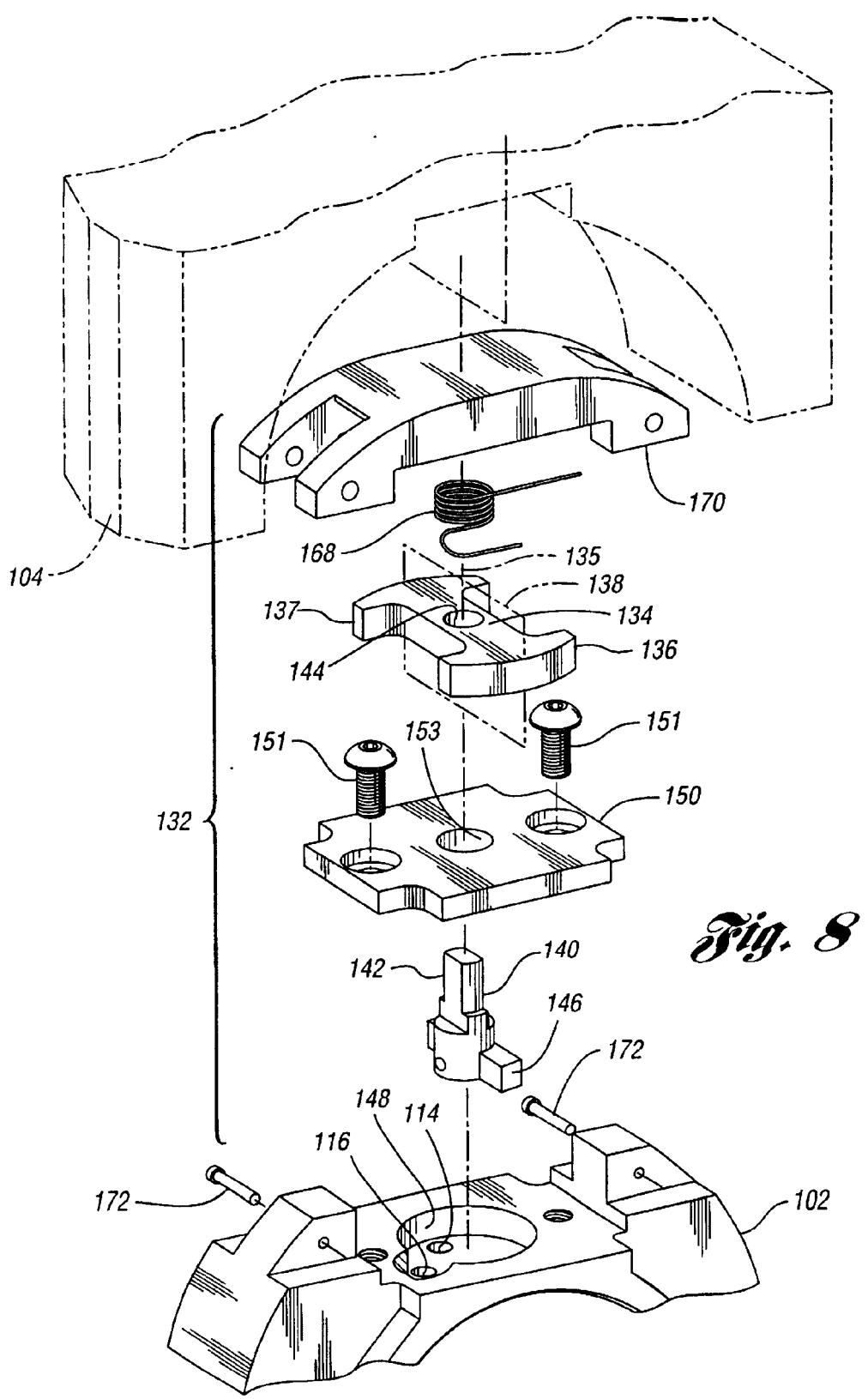
FIG. 8 is an exploded perspective view of a portion of the connecting rod assembly including the second locking mechanism.
Figure 9:
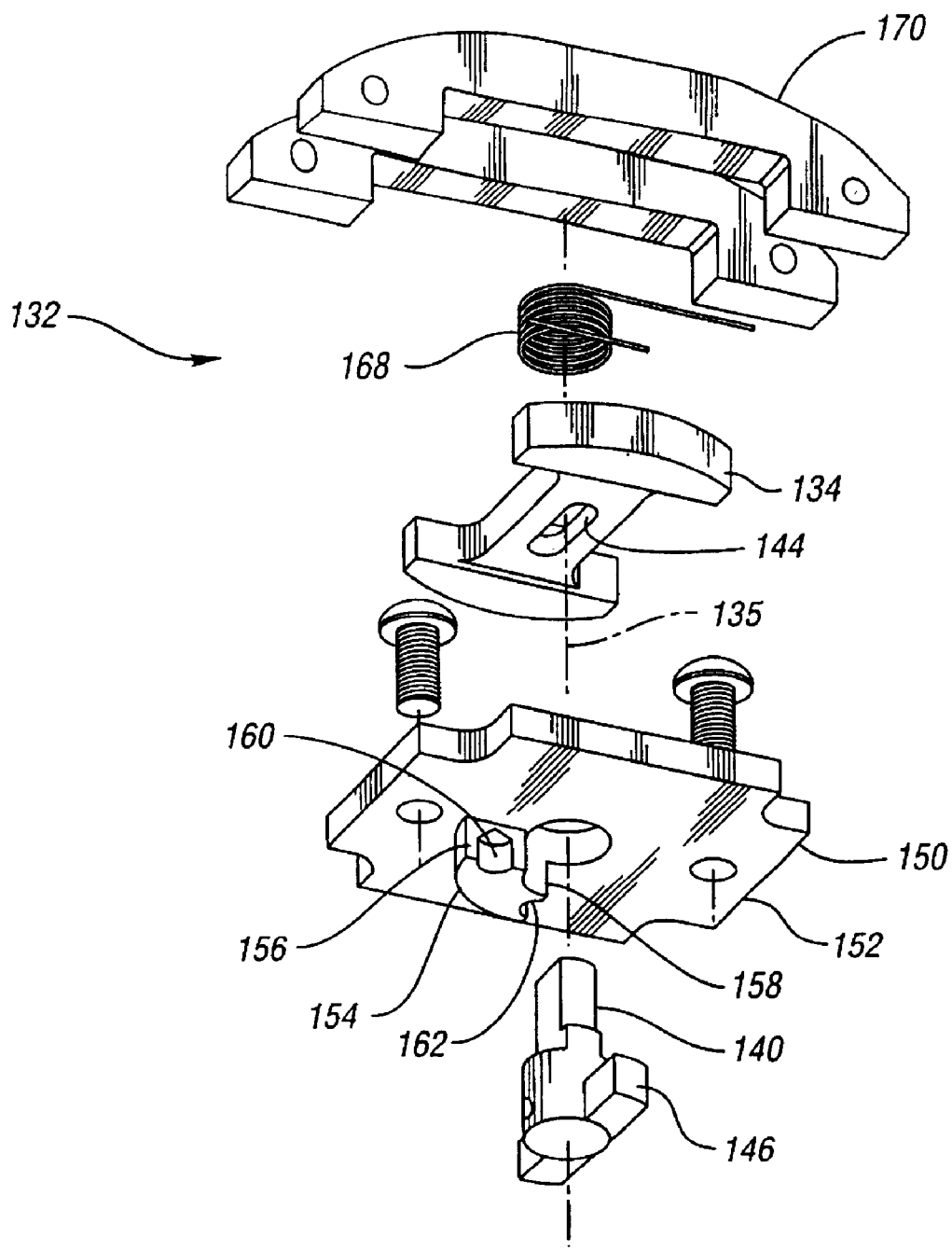
FIG. 9 is an exploded perspective view of the second locking mechanism.

Referring to FIGS. 8 and 9, additional features of the second locking mechanism 132 will now be described in detail. Because the first locking mechanism 130 is similar to the second locking mechanism 132, a thorough understanding of the first locking mechanism 130 will be apparent from the following description of the second locking mechanism 132. The locking element 134 of the first locking mechanism 130, however, is oriented 90 degrees in a clockwise direction relative to the locking element 134 of the second locking mechanism 132, such that the first locking mechanism 130 is in the unlocked position when the second locking mechanism 132 is in the locked position.

The locking element 134 of the second locking mechanism 132 includes first and second enlarged, arcuate ends 136 and 137, respectively, that are configured to overlap and engage the bearing retainer 102 and the body portion 104 when the locking element 134 is in the locked position, so as to create a compression fit between the bearing retainer 102 and the body portion 104. The locking element 134 also has a locking element plane 138 that bisects the locking element 134. Preferably, but not necessarily, the locking element plane 138 is aligned with the body portion plane 124 when the locking element 134 is in the locked position, such that compressive loading on the locking element 134 is generally uniform and symmetrical relative to locking element plane 138.

The second locking mechanism 132 further includes a rotatable pivot shaft 140 on which the locking element 134 is mounted or otherwise disposed, such that the locking element 134 is rotatable with the pivot shaft 140. The pivot shaft 140 includes a shaft portion 142 that extends into an aperture 144 of the locking element 134, and a base or vane portion 146 rotatably disposed at least partially in a generally cylindrical recess 148 of the bearing retainer 102.

A cover plate 150 is disposed between the locking element 134 and the vane portion 146, and is mounted to the bearing retainer 102, such as with fasteners 151, so as to retain the vane portion 146 at least partially in the recess 148. The plate 150 has a plate portion 152 and a projection 154 extending from the plate portion 152. The plate portion 152 has an aperture 153 for receiving the shaft portion 142 of the pivot shaft 140. The projection 154 defines first and second stops 156 and 158, respectively, that are engageable with the vane portion 146 so as to respectively stop the locking element 134 in the unlocked and locked positions. The projection 154 also has first and second grooves or channels 160 and 162, respectively, for routing fluid between the projection 154 and the vane portion 146. The first and second channels 160 and 162, respectively, are aligned with the first and second bearing retainer passages 114 and 116 of the bearing retainer 102 so as to receive pressurized fluid from the fluid supply system 14, as explained below in detail (the bearing retainer 102 is partially broken away in FIG. 8 to show the second fluid passage 116).

The second locking mechanism 132 further includes a spring, such as a torsion spring 168, disposed about the shaft portion 142 and engaged with the locking element 134 for urging the locking element 134 toward the locked position. In addition, the second locking mechanism 132 includes a cover or cap 170 attached to the bearing retainer 102 for retaining the locking element 134 and spring 168 on the bearing retainer 102. While the cap 170 may be attached to the bearing retainer 102 in any suitable manner, in the embodiment shown in FIG. 8, the cap 170 is attached to the bearing retainer 102 with fasteners 172.

Alternatively, the connecting rod assemblies 34 may have any suitable configuration that enables each connecting rod assembly 34 to vary its effective length. For example, each connecting rod assembly 34 may include one or more locking mechanisms having laterally movable locking elements, such as locking pins. As another example, each connecting rod assembly 34 may include an eccentric sleeve that couples to a wrist pin 36 or a crankpin 70, and a fluid activated locking mechanism that operates to lock the eccentric sleeve in a desired position.

Referring to FIGS. 4 through 8, a method for mounting the connecting rod assembly 34 on the crankshaft 32 will now be described. The method includes attaching first locking mechanism 130 to first section 110 of bearing retainer 102. The method further includes attaching second locking mechanism 132 to second section 112 of bearing retainer 102. The method further includes securing first and second sections 110 and 112 around crankpin 70 of crankshaft 32, such as with fasteners or by any other suitable means. Next, the method involves positioning first section 126 of body portion 104 over first locking mechanism 130, such that first locking mechanism 132 is received in a portion of an aperture defined by first section 126. The method further includes moving the locking element 134 of the first locking mechanism 130 to the unlocked position. Next, the method involves positioning second section 128 of body portion 104 over second locking mechanism 132, such that second locking mechanism 132 is received in a portion of an aperture defined by second section 128. The method further includes securing first section 126 to second section 128 in any suitable manner, such as with fasteners 129. Fasteners 129 may be, for example, bolts or screws.

Referring to FIGS. 2 through 9, operation of the system 10 will now be described in detail. First, the engine controller 16 may determine under which compression ratio mode the engine 12 is currently operating. This may be accomplished, for example, by sensing combustion pressure and/or by using the position sensors 59. When the engine controller 16 determines that it is desirable to change the compression ratio of the engine 12, based on one or more operating parameters such as engine speed and load, the engine controller 16 may control operation of fluid supply system 14 so as to supply pressurized oil from the high pressure pump 39 and/or accumulator 51 to the connecting rod assemblies 34. For example, if the engine controller 16 determines that it is desirable to change from high compression ratio mode shown in FIG. 5 to low compression ratio mode shown in FIG. 4, the engine controller 16 may open first valve 44 of fluid supply system 14 for a predetermined amount of time, such as 100 to 300 milliseconds, while keeping second valve 46 closed. As a result, pressurized oil is routed through first high pressure passage arrangement 42, and a pressure differential is created across the first and second high pressure passage arrangements 42 and 43, respectively, which activates the locking mechanisms 130 and 132 of the connecting rod assemblies 34.

More specifically, referring to FIGS. 5, 8 and 9, pressurized oil from first high pressure passage arrangement 42 may travel through main bearing 48 and first fluid passage 94 to first groove 86, and then into first bearing retainer passage 114 of bearing retainer 102. Next, pressurized oil passes into recess 148 and second channel 162 of second locking mechanism 132. The pressurized oil acts on vane portion 146 of pivot shaft 140 so as to cause the pivot shaft 140 and locking element 134 of the second locking mechanism 132 to rotate approximately 90 degrees until vane portion 146 contacts first stop 156. In other words, the pressurized oil causes the locking element 134 of the second locking mechanism 132 to rotate from the locked position shown in FIGS. 5 and 9 to the unlocked position shown in FIG. 4.

With both locking mechanisms 130 and 132 in the unlocked position, the body portion 104 is able to move axially relative to the bearing retainer 102 from the extended position shown in FIG. 5 to the unextended position shown in FIG. 4. Such movement occurs as a result of inertia of the body portion 104. Once the body portion 104 reaches the unextended position, pressurized oil passing from first groove 86, and through third bearing retainer passage 174, acts on first locking mechanism 130, in a similar manner as described above with respect to second locking mechanism 132, so as to cause the locking element 134 of the first locking mechanism 130 to rotate to the locked position shown in FIG. 4.

When the engine controller 16 determines that it is desirable to change back to high compression ratio mode, the engine controller 16 may control operation of the fluid supply system 14 so as to route pressurized oil through the second high pressure passage arrangement 43. Next, pressurized oil may travel through main bearing 48' and second fluid passage 96, into second groove 88, and then into fourth bearing retainer passage 176 of bearing retainer 102. Pressurized oil passing from fourth bearing retainer passage 176 then acts on the first locking mechanism 130 so as to move the locking element 134 to the unlocked position, thereby allowing the body portion 104 to move from the unextended position shown in FIG. 4 to the extended position shown in FIG. 5. Once the body portion 104 reaches the extended position, pressurized oil passing from second groove 88, and through second bearing retainer passage 116, acts on second locking mechanism 132 so as to cause the locking element 134 to rotate to the locked position shown in FIG. 5.

Similar to the bearing retainer passages 114 and 116, each bearing retainer passage 174 and 176 extends at least partially axially outwardly of the rod bearing 76 at the inner circumferential surface of the bearing retainer 102. In the embodiment shown in FIGS. 4 and 5, each bearing retainer passage 174 and 176 is disposed entirely axially outwardly of the rod bearing 76 at the inner circumferential surface of the bearing retainer 102.

It should be noted that adjacent connecting rod assemblies 34 are rotated 180 degrees with respect to each other so that oil supplied to a particular main journal portion 74, 74' can be routed to respective adjacent connecting rod assemblies 34 to vary the effective length of the adjacent connecting rod assemblies 34 in the same manner. As a result, the effective length of all connecting rod assemblies 34 may be changed in unison from one effective length to another effective length.

The crankshaft 32 of the invention includes several beneficial aspects. First, because pressurized oil is provided to side surface portions 80 and 82 of the crankpins 70, associated rod bearings 76 do not need to be provided with apertures for allowing oil to pass into the connecting rod assemblies 34. As a result, surface area available for lubrication is maximized, which allows for increased rod bearing life. Second, if the crankshaft 32 is provided with grooves 86 and 88, the grooves 86 and 88 cooperate with the crank cheeks 72 and rod bearings 76 to guide the oil to the connecting rod assemblies 34 in a continuous manner. For example, when oil is provided to a particular groove 86 or 88, the oil may form a continuous ring along the particular groove 86 or 88. Furthermore, because the distance between the grooves 86 and 88 is relatively large, cross-communication between the grooves 86 and 88 is minimized.

Figure 10:
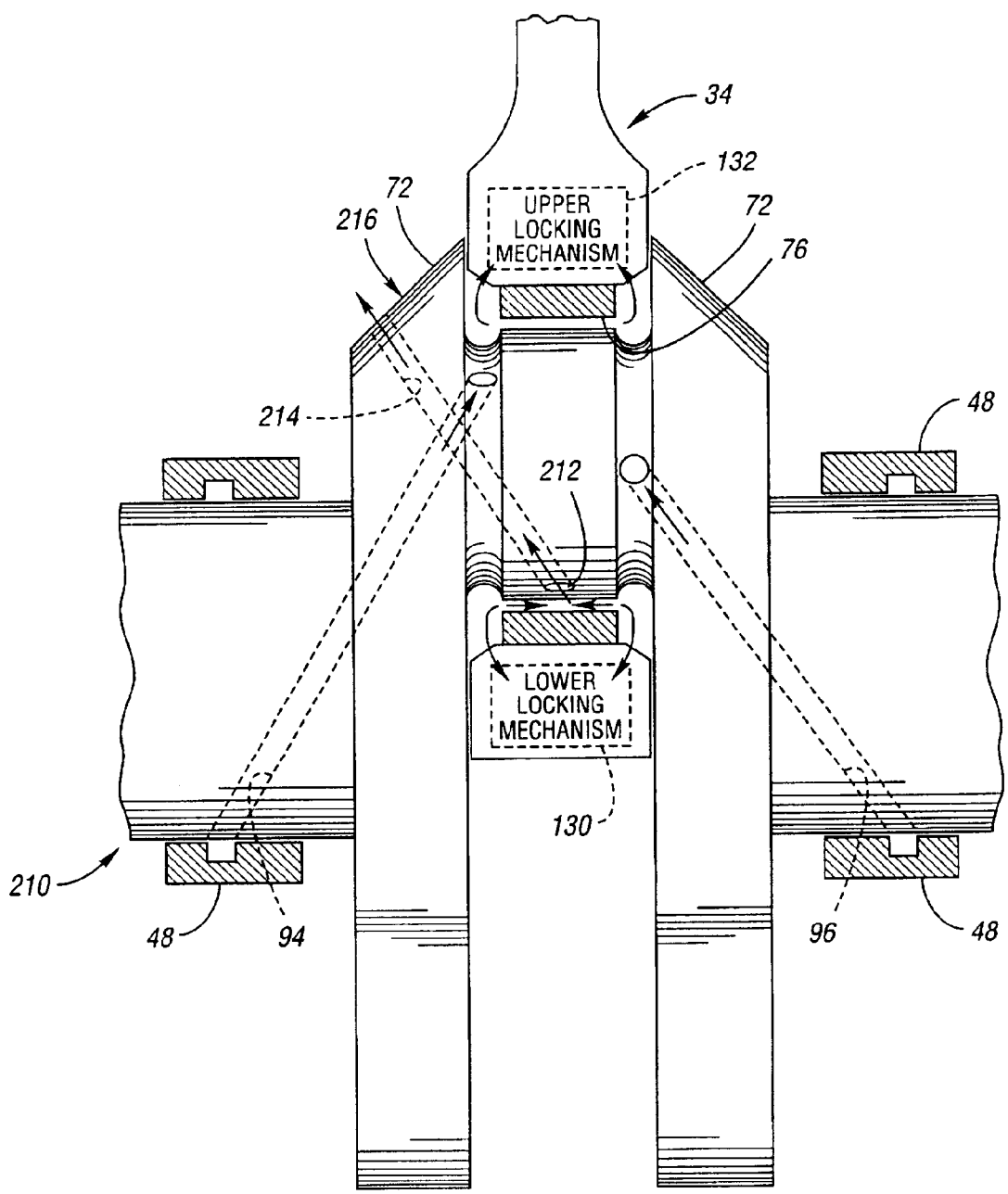
FIG. 10 is a schematic diagram of a second embodiment of the crankshaft.

FIG. 10 shows a second embodiment 210 of the crankshaft according to the invention. The crankshaft 210 includes similar features as the crankshaft 32, and the similar features are shown with the same reference numbers as used with the crankshaft 32. Instead of the third apertures 98 and third fluid passages 100, the crankshaft 210 includes bleed apertures 212 and bleed passages 214. As shown in FIG. 10, each bleed passage 214 extends from a respective bleed aperture 212 to an outer surface 216 of a respective crank cheek 72, such that the bleed passage 214 is exposed to ambient air pressure. Thus, each bleed passage 214 is defined at least partially by a respective crankpin 70 and a respective crank cheek 72. With such a configuration, pressurized oil provided by the fluid passages 94 and 96 to the crankpins 70 will be drawn toward the bleed apertures 212, thereby lubricating the rod bearings 76.

Flow lines are provided in FIG. 10 to indicate the directions in which oil may flow. Furthermore, the space between the crankpin 70 and the rod bearing 76 is exaggerated to make room for the flow lines.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A crankshaft for use with a variable compression ratio engine having a connecting rod and a rod bearing associated with the connecting rod, the crankshaft comprising:

a crankpin adapted to be coupled to the connecting rod with the rod bearing disposed between the crankpin and the connecting rod, the crankpin including a circumferential surface having first and second side surface portions and a main surface portion disposed between the side surface portions, the main surface portion being configured to receive the rod bearing, the first side surface portion having a first aperture that is disposed at least partially outwardly of the rod bearing when the rod bearing is received on the main surface of the crankpin and the crankpin is coupled to the connecting rod, the crankpin further defining, at least partially, a first fluid passage in fluid communication with the first aperture for supplying pressurized fluid to the first aperture, wherein the fluid is useable to vary compression ratio of the engine.

2. The crankshaft of claim 1 wherein each side surface portion defines a circumferential groove.

3. The crankshaft of claim 1 wherein the second side surface portion has a second aperture that is disposed at least partially outwardly of the rod bearing when the rod bearing is received on the main surface of the crankpin and the crankpin is coupled to the connecting rod, and the crankpin further defines, at least partially, a second fluid passage in fluid communication with the second aperture for supplying pressurized fluid to the second aperture.

4. The crankshaft of claim 1 wherein the main surface portion has a main surface aperture, and the crankpin further defines, at least partially, an additional fluid passage in fluid communication with the main surface aperture for supplying lubricating fluid to the rod bearing.

5. The crankshaft of claim 1 wherein the main surface portion has a main surface aperture, and the crankpin further defines, at least partially, a bleed passage in fluid communication with the main surface aperture for allowing fluid to travel away from the main surface portion.

6. A crankshaft for use with a variable compression ratio engine having a connecting rod assembly and a rod bearing associated with the connecting rod assembly, wherein the connecting rod assembly has a variable effective length, the crankshaft comprising:

a crankpin adapted to be coupled to the connecting rod assembly with the rod bearing disposed between the crankpin and the connecting rod assembly, the crankpin including a circumferential surface having first and second side surface portions and a main surface portion disposed between the side surface portions, the main surface portion being configured to receive the rod bearing, the first side surface portion having a first aperture and defining a first circumferential groove, the second side surface portion having a second aperture and defining a second circumferential groove, the crankpin further defining, at least partially, first and second fluid passages in fluid communication with the first and second apertures, respectively, for supplying pressurized fluid to the apertures so as to vary the effective length of the connecting rod assembly.

7. A variable compression ratio internal combustion engine comprising:

a reciprocating piston;

a connecting rod assembly connected to the piston;

a rod bearing associated with the connecting rod assembly; and a crankshaft having a crankpin coupled to the connecting rod assembly such that the rod bearing is disposed between the crankpin and the connecting rod assembly, the crankpin including a circumferential surface having first and second side surface portions and a main surface portion disposed between the side surface portions, the main surface portion mating with the rod bearing, the first side surface portion having a first aperture that is disposed at least partially outwardly of the rod bearing, the crankshaft further including a first fluid passage in fluid communication with the first aperture for supplying pressurized fluid to the first aperture and the connecting rod assembly such that the fluid is useable to vary compression ratio of the engine.

8. The engine of claim 7 wherein the connecting rod assembly has an effective length that is variable, and the fluid acts on the connecting rod assembly to vary the effective length.

9. The engine of claim 8 wherein the connecting rod assembly includes first and second locking mechanisms that are operative to achieve two different effective lengths of the connecting rod assembly, and wherein the fluid acts on at least one locking mechanism to thereby vary the effective length of the connecting rod assembly.

10. The engine of claim 7 wherein each side surface portion of the crankpin defines a circumferential groove.

11. The engine of claim 7 wherein the second side surface portion of the crankpin has a second aperture that is disposed at least partially outwardly of the rod bearing, and the crankshaft further includes a second fluid passage in fluid communication with the second aperture for supplying pressurized fluid to the second aperture.

12. The engine of claim 7 wherein the main surface portion has a main surface aperture, and the crankshaft further includes an additional fluid passage in fluid communication with the main surface aperture for supplying lubricating fluid to the rod bearing.

13. The engine of claim 7 wherein the main surface portion has a main surface aperture, and the crankshaft further has a bleed passage in fluid communication with the main surface aperture for allowing fluid to travel away from the main surface portion, such that fluid may travel from the first side surface portion to the main surface portion and through the main surface aperture.

14. A variable compression ratio internal combustion engine comprising:
   a crankpin having a groove extending substantially around the crankpin and adapted to communicate with a pressurized fluid source; and
   a variable compression ratio mechanism in communication with the groove and configured to change a compression ratio of the engine in response to fluid being supplied to the groove from the pressurized fluid source.

15. A method of controlling an engine having a variable compression ratio mechanism for varying compression ratio in a cylinder of the engine, the variable compression ratio mechanism being operably associated with an engine crankpin, the method comprising:
   supplying fluid to a substantially circumferential groove on the engine crankpin; and
   inducing the variable compression ratio mechanism to change the compression ratio in the cylinder in response to the supplied fluid.

16. The method of claim 15 wherein the supplied fluid does not travel through a rod bearing disposed about the engine crankpin.

17. A method of controlling an engine having a variable compression ratio mechanism for varying compression ratio in a cylinder of the engine, the variable compression ratio mechanism being operably associated with an engine crankpin, the method comprising:
   supplying fluid to a groove on the engine crankpin; and
   supplying the fluid from the groove to the variable compression ratio mechanism, without passing the fluid through a rod bearing disposed about the engine crankpin, to change the compression ratio in the cylinder.

18. A crankshaft for use with a variable compression ratio engine having a variable effective length connecting rod and a rod bearing associated with the connecting rod, the crankshaft comprising:
   at least one crankpin including a main surface portion having a first diameter for receiving a connecting rod bearing and two side surface portions having a second diameter wherein at least one of the side surface portions includes an aperture for delivering pressurized fluid to vary the effective length of the connecting rod.

19. The crankshaft of claim 18 wherein the aperture is disposed at least partially outwardly of the rod bearing when the rod bearing is received on the main surface portion.

20. The crankshaft of claim 18 wherein at least one of the side surface portions has a diameter less than the main surface portion.

21. The crankshaft of claim 18 wherein at least one of the side surface portions includes a circumferential groove extending at least about 75 percent around the circumference of the crankpin.

22. The crankshaft of claim 21 wherein at least a portion of the aperture connects the circumferential groove to a fluid supply passage in the crankshaft.

23. The crankshaft of claim 18 wherein the at least one crankpin includes at least one main surface aperture for delivering lubricating fluid to the rod bearing.

24. The crankshaft of claim 18 wherein the first and second side surface portions have different diameters.

25. The crankshaft of claim 18 wherein at least one of the first and second side surface portions has a diameter different from the main surface portion.

26. A crankshaft for use with a variable compression ratio engine having a variable effective length connecting rod and a rod bearing associated with the connecting rod, the crankshaft comprising:
   at least one crankpin including a main surface portion having a first diameter for receiving a connecting rod bearing and two side surface portions having diameters smaller than the main surface portion wherein at least one of the side surface portions includes an aperture for delivering pressurized fluid to vary the effective length of the connecting rod.

27. A crankshaft for use with a variable compression ratio engine, the crankshaft comprising:
   at least one crankpin including a main surface portion having a first diameter for receiving a connecting rod bearing and at least one main surface aperture for supplying lubricating fluid to the rod bearing, the crankpin further including at least one side surface portion having a diameter smaller than the main surface portion and including at least one side surface aperture extending at least partially outwardly of the rod bearing for delivering pressurized fluid to an engine component to vary the compression ratio of the engine.

* * * * *